United States Patent
Lee et al.

(10) Patent No.: US 10,097,618 B2
(45) Date of Patent: Oct. 9, 2018

(54) CLUSTER SYSTEM AND COMMUNICATION METHOD IN CLUSTER SYSTEM

(71) Applicant: SNU R&DB FOUNDATION, Seoul (KR)

(72) Inventors: Jaejin Lee, Seoul (KR); Jungwon Kim, Seoul (KR); Junghyun Kim, Hwaseong-si (KR)

(73) Assignee: SNU R&DB FOUNDATION, Seoul (KR)

( * ) Notice: Subject to any disclaimer, the term of this patent is extended or adjusted under 35 U.S.C. 154(b) by 510 days.

(21) Appl. No.: 14/595,371

(22) Filed: Jan. 13, 2015

(65) Prior Publication Data

US 2015/0201006 A1    Jul. 16, 2015

(30) Foreign Application Priority Data

Jan. 15, 2014  (KR) .................. 10-2014-0005051
Dec. 24, 2014  (KR) .................. 10-2014-0187852

(51) Int. Cl.
*H04L 29/08*    (2006.01)
*G06F 9/455*    (2018.01)
*G06F 9/50*     (2006.01)

(52) U.S. Cl.
CPC ............. *H04L 67/10* (2013.01); *G06F 9/455* (2013.01); *G06F 9/5077* (2013.01); *H04L 67/1008* (2013.01)

(58) Field of Classification Search
CPC ... H04L 67/10; H04L 67/1008; H04L 5/0069; G06F 9/5077; G06F 9/455; G06F 17/30241; G06F 2212/312; H04N 21/25841
See application file for complete search history.

(56) References Cited

U.S. PATENT DOCUMENTS

2014/0075029 A1*  3/2014  Lipchuk .................. G06F 9/505
                                                  709/226
2016/0014216 A1*  1/2016  Chawla ................... H04L 67/08
                                                  715/740

FOREIGN PATENT DOCUMENTS

KR   1998-036294 A      8/1998
KR   10-2007-0062607 A  6/2007
KR   10-2011-0060849 A  6/2011

* cited by examiner

*Primary Examiner* — Arvin Eskandarnia
(74) *Attorney, Agent, or Firm* — KORUS Patent, LLC; Seong Il Jeong

(57) ABSTRACT

A cluster system and a communication method in the cluster system are disclosed herein. The cluster system includes one or more nodes. Each of the one or more nodes includes at least one physical computation device and a virtualization module. The virtualization module manages at least one computation device. The each of the one or more nodes operates as a host node based on the virtual computation device.

13 Claims, 3 Drawing Sheets

CLUSTER SYSTEM AND COMMUNICATION METHOD IN CLUSTER SYSTEM

BACKGROUND

1. Technical Field

The present invention relates to a cluster system and a communication method in the cluster system and, more particularly, to a cluster system based on a parallel computing framework and a communication method in the cluster system.

2. Description of the Related Art

Recently, Open Computing Language (OpenCL) has attracted attention as a representative parallel programming model.

OpenCL is an open general-purpose parallel computing framework, and enables programs operating on a multi-platform (e.g., a plurality of central processing units (CPUs) or graphics processing units (GPUs)) to be created.

OpenCL can operate on various types of hardware that are manufactured by various hardware manufacturers. Many manufacturers are fabricating frameworks suitable for their hardware based on OpenCL.

In connection with this, in a conventional cluster system including a plurality of nodes, OpenCL operates at a host node, and other nodes frequently communicate the host node in order to perform computation. This deteriorates the performance of the overall cluster system.

That is, one of the nodes that form a common cluster system may become a host node, and the host node may execute OpenCL. This host node may copy data into computation devices, and may receive the results of computation that has been performed by each of the computation devices. In this processing process, the host node should continue to communicate with other nodes present within the cluster system. In this case, a problem arises in that the performance of the cluster system is deteriorated because a bottleneck phenomenon attributable to the communication occurs as the number of nodes within the cluster system increases.

Korean Patent Application Publication No. 10-1998-0036294, which is a related art document, proposes a data distribution and communication method in a shared memory system, in which the distribution of data in a shared memory form and the distribution of data in a distributed memory form are employed in a mixed manner by utilizing proposed HPCC functions using MPI functions, so that the distribution of data in a shared memory form is performed within one node and the distribution of data in a distributed memory form is performed outside the node. However, this technology does not solve the aforementioned problem.

Accordingly, there is a need for a technology that is capable of solving the aforementioned problem.

Meanwhile, the above-described related art corresponds to technical information that has been possessed by the present inventor in order to contrive the present invention or that has been acquired in the process of contriving the present invention, and cannot be necessarily viewed as technology well known to the public before the filing of the present invention.

SUMMARY

At least one embodiment of the present invention is directed to the proposition of a cluster system and a communication method in the cluster system.

In accordance with a first aspect of the present invention, there is provided a cluster system including one or more nodes, wherein each of the one or more nodes includes at least one physical computation device, and a virtualization module configured to manage at least one computation device, and wherein the each of the one or more nodes operates as a host node based on the virtual computation device.

In accordance with a second aspect of the present invention, there is provided a communication method in a cluster system including one or more nodes, the communication method including generating, by each of the one or more nodes, a virtual computation device; and operating, by the each of the one or more nodes, as a host node based on the virtual computation device.

In accordance with a third aspect of the present invention, there is provided a computer-readable storage medium having stored therein computer-readable program instructions that, when executed by a computer, cause the computer to perform a method including generating, by each of one or more nodes included in a cluster system, a virtual computation device; and operating, by the each of the one or more nodes, as a host node based on the virtual computation device.

In accordance with a fourth aspect of the present invention, there is provided a computer-executable program that, when executed by a computer, causes the computer to perform a method including generating, by each of one or more nodes included in a cluster system, a virtual computation device; and operating, by the each of the one or more nodes, as a host node based on the virtual computation device.

In accordance with any one of the above-described means of the present invention, an embodiment of the present invention can present an effective communication method in a cluster system.

Furthermore, in accordance with any one of the above-described means of the present invention, an embodiment of the present invention can improve a conventional centralized communication method in a cluster system because the concentration of communication on a host node can be prevented by the embodiment of the present invention.

Moreover, in accordance with any one of the above-described means of the present invention, communication in a cluster system is made possible by using only OpenCL without using a communication library, such as an MPI. This provides an easier programming environment to a programmer who programs a parallel computing framework-based cluster system, and thus the programmer can easily extend a cluster system.

The advantages of the present invention are not limited to the above-described advantages, and other advantages that have not been described above will be readily apparent to those skilled in the art from the following description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention are described in detail below with reference to the accompanying drawings so that those having ordinary knowledge in the technical field to which the present invention pertains can easily practice the present invention. The present invention may be implemented in various different forms, and is not limited to the embodiments described herein. Throughout the accompanying drawings, parts unrelated to the present invention are omitted in order to clearly describe the present invention, and like reference symbols are assigned to like components.

Throughout the specification and the claims, when one component is described as being "connected" to another component, the one component may be "directly connected" to the other component or "indirectly connected" to the other component via a third component. Furthermore, unless explicitly described to the contrary, the terms "include" and "comprise" and their variants, such as "includes," "including," "comprises" and "comprising," will be understood to imply the inclusion of stated components, not the exclusion of any other components.

The present invention is described in detail below with reference to the accompanying drawings.

Prior to the description of the embodiments, the meanings of terms used herein are defined first.

The term "physical computation device" refers to a computation device actually included in a node. In contrast, the term "virtual computation device" refers to not a computation device actually included in a node but a virtualized physical computation device placed at another node. By including a virtual computation device, a node may be implemented as if it included a physical computation device placed at another node.

Figure 1:
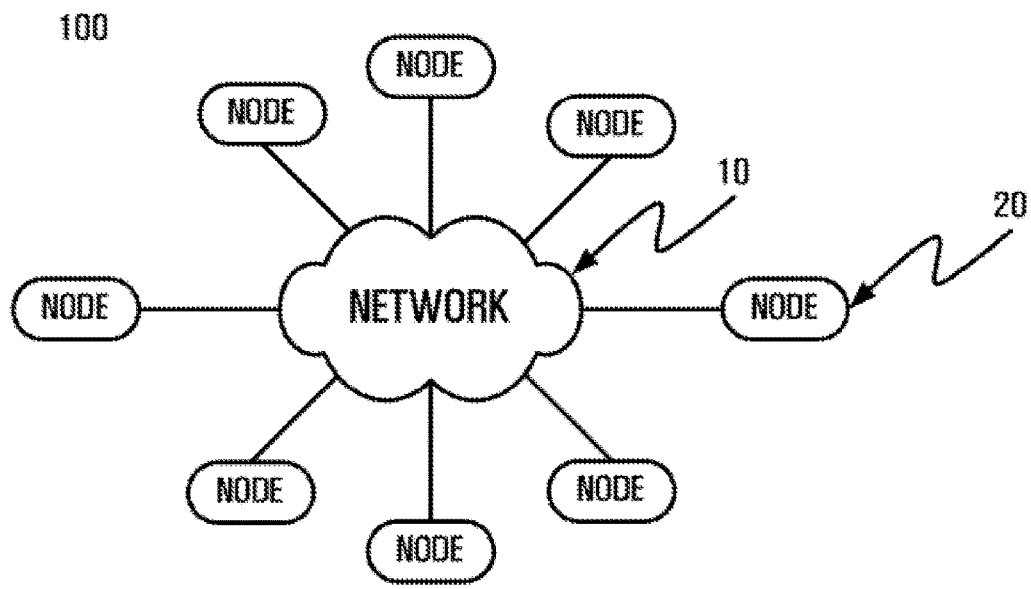
FIG. 1 is a block diagram illustrating a cluster system according to an embodiment of the present invention.

FIG. 1 is a block diagram illustrating a cluster system 100 according to an embodiment of the present invention.

The cluster system 100 is a system capable of providing a homogeneous manycore cluster environment, and can execute an OpenCL application.

This cluster system 100 may include a network 10 and one or more nodes 20.

The network 10 may be implemented using an interconnection network, such as an InfiniBand or Ethernet network. The one or more nodes 20 may perform communication for the operation of an OpenCL application over the network 10.

Each of the nodes 20 may include one or more computation devices and process the workload of an OpenCL application using the one or more computation devices.

The cluster system 100 including the nodes 20, such as those described above, may execute an OpenCL application at all the nodes that form the cluster system. In particular, one node may be implemented as if it included a computation device placed at another node by virtualizing the computation device placed at the other node.

The cluster system 100 may further include a communication module (not illustrated).

That is, when the exchange of data between the virtual computation device and physical computation device of a first node, i.e., one of the nodes of the cluster system 100, is requested, the communication module may handle the exchange of data between nodes so that the first node may exchange data with a second node that includes a physical computation device corresponding to the virtual computation device of the first node.

Furthermore, when the physical computation device of the first node included in the cluster system 100 triggers an event for the virtual computation device of the first node, the communication module may operate so that the first node may transfer the triggering to the second node that includes the physical computation device corresponding to the virtual computation device of the first node.

Furthermore, when the physical computation device of the first node included in the cluster system 100 waits for an event that is triggered by the virtual computation device of the first node, the first node may wait for the transfer of an event from the second node that includes the physical computation device corresponding to the virtual computation device of the first node. In this case, when the second node generates the event, the communication module may transfer the event to the first node.

Moreover, when the virtual computation device of the first node included in the cluster system 100 attempts to read the value of a memory object updated by the physical computation device of the first node, the communication module may operate so that the first node may transfer the updated value of the memory object to the second node that includes the physical computation device corresponding to the virtual computation device of the first node.

The terms "first node" and "second node" described above have been used merely to distinguish between the nodes, and are not intended to refer to specific nodes.

Figure 2:
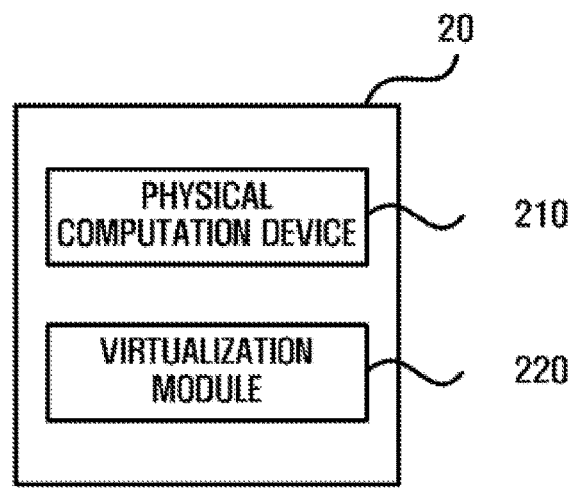
FIG. 2 is a block diagram illustrating a node included in the cluster system according to an embodiment of the present invention.

FIG. 2 is a block diagram illustrating the configuration of each of the nodes 20 included in the cluster system 100 according to an embodiment of the present invention.

As illustrated in FIG. 2, the node 20 may include a physical computation device 210 and a virtualization module 220.

In this case, the physical computation device 210 is capable of graphic processing, and may be capable of common computation in addition to graphic processing. This physical computation device may be, for example, a central processing unit (CPU), a graphics processing unit (GPU), a Cell BE processor, an Intel® Xeon phi coprocessor, or an accelerator.

Furthermore, the physical computation device 210 may be separated into one or more computation units. Each of the computation units may include one or more computation elements.

The virtualization module 220 is a module that manages one or more virtual computation devices. That is, one node included in the cluster system 100 may be implemented as if it included a physical computation device placed at another node by virtualizing the physical computation device placed at the other node. Accordingly, the node 20 may include a virtual computation device corresponding to the physical computation device included at the other node. This virtual computation device may be generated and managed by the virtualization module 220.

In connection with this, a virtual computation device is determined based on availability information, i.e., information about the total available computational capacity of the cluster system. The availability information may be determined based on the computation device information of each of the one or more nodes.

In this case, the "computation device information" may include information about the computational capability of a physical computation device included in each of the nodes. Furthermore, the "availability information" means information about the total available computational capacity of the cluster system. Accordingly, the availability information may be information about the total computational capability of all the physical computation devices included in the cluster system, or may be information about the computational capability of each of all the physical computation devices included in the cluster system.

Each of the nodes may generate a virtual computation device corresponding to the physical computation device of each of other nodes based on this availability information. For example, each of the nodes may generate a virtual computation device including availability information, may generate a virtual computation device based on the division of availability information, or may generate a virtual computation device corresponding to each of all physical computation devices included in the cluster system based on availability information.

The node 20 including the physical computation device 210 and the virtualization module 220 may operate as a host node. For this purpose, when an OpenCL application is executed at the node 20 and receives a command intended for the node 20, the OpenCL application may transfer the command to a corresponding physical computation device if it is determined that the command is a command intended for the one or more physical computation devices, and may ignore the command if it is determined that the command is a command intended for the one or more virtual computation devices.

Figure 3:
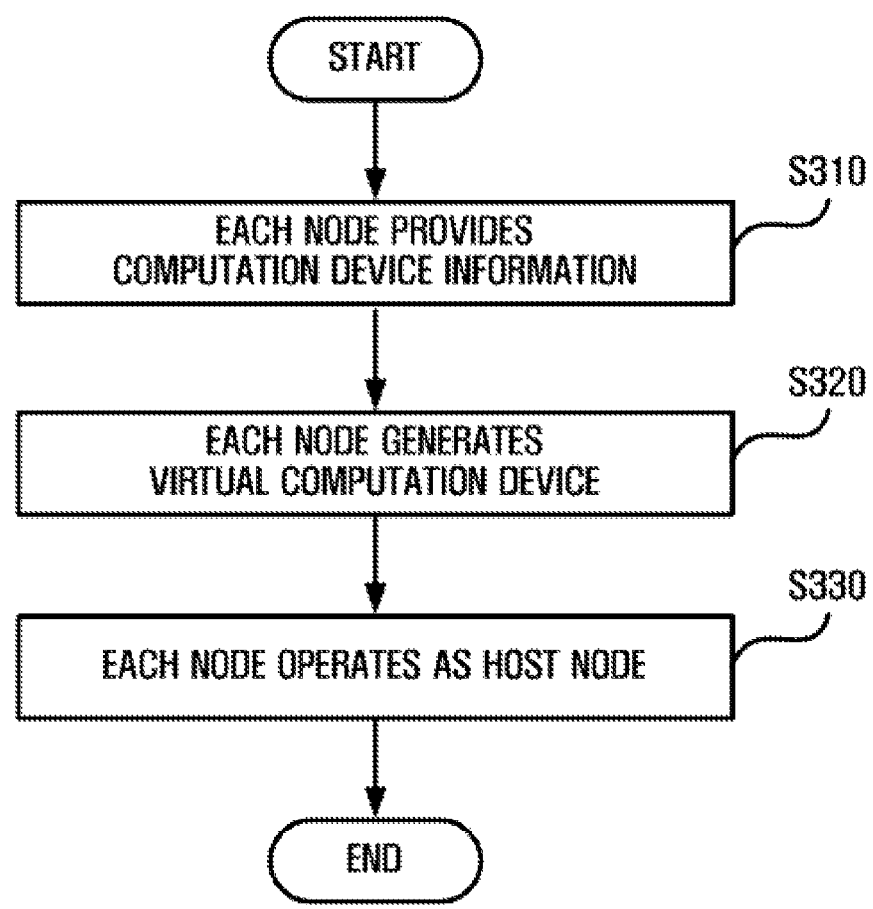
FIG. 3 is a flowchart illustrating a communication method in a cluster system according to an embodiment of the present invention.

FIG. 3 is a flowchart illustrating a communication method in the cluster system according to an embodiment of the present invention.

The communication method according to the embodiment of FIG. 3 includes steps that are processed by the cluster system 100 illustrated in FIGS. 1 and 2 in a time-sequential manner.

Accordingly, although some descriptions given above in connection with the cluster system 100 of FIGS. 1 and 2 are omitted below, they may also be applied to the communication method according to the embodiment of FIG. 3.

Figure 4:
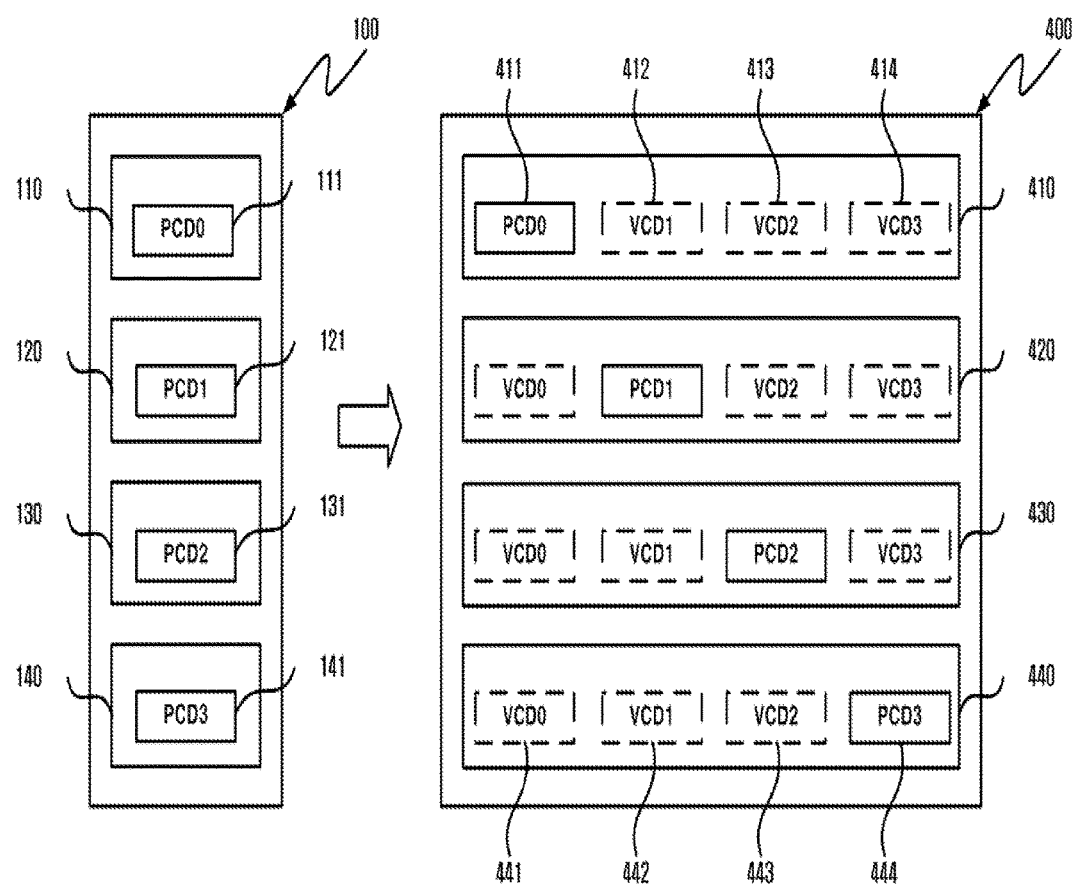
FIG. 4 is a diagram illustrating an example of a communication method in a cluster system according to an embodiment of the present invention.

FIG. 3 is described in connection with FIG. 4 below. FIG. 4 is a diagram illustrating an example of a communication method in the cluster system according to an embodiment of the present invention.

As illustrated in FIG. 3, each of the one or more nodes 20 included in the cluster system 100 may provide computation device information at step S310, and may generate a computation device based on the computation device information at step S320.

That is, in accordance with an embodiment of the present invention, each of one or more nodes 20 may provide computation device information to a root node. For this purpose, the cluster system 100 may determine one of the one or more nodes of the cluster system to be a root node. In this case, the root node may be determined by a user, or may be determined by default in the cluster system. Each node of the cluster system may provide information about its own computation device, i.e., computation device information, to a root node that is determined as described above. The root node may collect computation device information provided by the individual nodes and compute availability information based on the collected computation device information. The root node may provide each node with the computed availability information. Each node may receive the availability information. Accordingly, each node may generate a computation device based on the availability information.

In accordance with another embodiment of the present invention, each of one or more nodes may be aware of the presence of other nodes within the cluster system, and may provide each of the other nodes with computation device information. Accordingly, each of the one or more nodes may collect computation device information from the other nodes, and compute availability information based on the collected computation device information. Each of the one or more nodes may generate a virtual computation device based on the availability information that is computed as described above.

As described above, each node may virtualize the physical computation device of another node as if it included the physical computation device in addition to its own physical computation device.

That is, as illustrated in FIG. 4, the cluster system 100 may include one or more nodes 110, 120, 130 and 140. It may be assumed that the nodes 110, 120, 130 and 140 include respective physical computation devices 111, 121, 131 and 141.

When this cluster system 100 operates in accordance with a communication method in the cluster system according to an embodiment of the present invention, each of the nodes 110, 120, 130 and 140 of the cluster system 100 may include the physical computation devices of other nodes by virtualizing the physical computation devices of the other nodes, like each of the nodes 410, 420, 430 and 440 of a cluster system 400.

For example, although the node 410 physically includes only the physical computation device (PCD0) 411, it may operate as if it included the physical computation devices (PCD1, PCD2 and PCD3) 121, 131 and 141 of other nodes 420, 430 and 440 as virtual computation devices (VCD1, VCD2 and VCD3) 412, 413 and 414. Furthermore, although another node 440 physically includes only the physical computation device (PCD3) 444, it may operate as if it included the physical computation device (PCD0, PCD1 and PCD2) 111, 121 and 131 of other nodes 410, 420 and 430 as virtual computation devices (VCD0, VCD1 and VCD2) 441, 442 and 443.

Each of the one or more nodes may operate as a host node based on these virtual computation devices at step S330.

That is, each node may execute host code that will be executed on a host node.

For example, when a command enters the command queue of a computation device, each node including a physical computation device and virtual computation devices may process the command in accordance with the characteristics of the computation device.

That is, when a command enters the command queue of a physical computation device, each node may transfer the command to an OpenCL framework. In contrast, when a command enters the command queue of a virtual computation device, each node may ignore the command.

When each node needs to exchange data between its own physical computation device and virtual computation device, the node may operate as a host node by automatically performing the exchange of the data with another node that includes a physical computation device corresponding to the virtual computation device.

For example, when the physical computation device (PCD0) 411 of the node 410 of the cluster system 400 has data to be transferred to the virtual computation device (VCD3) 414, the node 410 may transfer the data to the node 440 that includes the physical computation device (PCD3) 444 corresponding to the virtual computation device (VCD3) 414.

Meanwhile, each node including a physical computation device and a virtual computation device may perform event synchronization by executing host code, thereby operating as a host node.

That is, when the physical computation device of each node triggers an event intended for the virtual computation device of the node, the node may transfer the triggering to another node that includes a physical computation device corresponding to the virtual computation device. Furthermore, when the physical computation device of each node waits for an event triggered by the virtual computation device of the node, the node may operate to wait for the event from another node that includes a physical computation device corresponding to the virtual computation device.

For example, each of the nodes 410, 420, 430 and 440 of the cluster system 400 may perform event synchronization. That is, a function for the insertion of a command into an OpenCL command queue includes parameters regarding all events. Accordingly, when the command is inserted into the queue, an event for which the corresponding command needs to wait may be explicitly indicated, or an event through which the execution state of the corresponding command can be checked may be received. Accordingly, for example, when the node 410 is aware that a command c1 is being executed in the physical computation device (PCD0) 411 and a command c2 for waiting for the termination of the command c1 waits in the virtual computation device (VCD3) 414, the node 410 needs to transfer a completion event, indicating that the execution of the command c1 has been completed, to the node 440 after the execution of the command c1 has been completed. The node 410 may perform the transfer of the completion event because host code that enables this process to be processed is being executed at the node 410.

Meanwhile, each node including a physical computation device and a virtual computation device may also perform memory synchronization by executing host code, thereby operating as a host node.

That is, when the virtual computation device of each node attempts to read the value of a memory object updated by the physical computation device of the node, the node may transfer the updated value of the memory object to another node that includes a physical computation device corresponding to the virtual computation device.

For example, each of the nodes 410, 420, 430 and 440 of the cluster system 400 may perform memory synchronization. That is, the cluster system 400 needs to continue to perform an operation of updating the latest value of memory. Accordingly, for example, when the command c1 of the physical computation device (PCD0) 411 of the node 410 attempts to modify the value of a memory object m1 and the command c2 of the virtual computation device (VCD3) 414 of the node 410 attempts to read the value of the memory object m1, each of the nodes 410 and 440 may determine which node requires which data because host code is being executed at each of the nodes 410 and 440. Accordingly, the node 410 may transfer the value of the memory object m1 to the node 440, and thus a memory synchronization operation may be securely performed.

As described above, each of nodes included in a cluster system is allowed to execute a required part of host code, and communication between nodes is performed through communication between computation devices, which can be been determined by analyzing the host code. Accordingly, each node may operate as if it communicated with all the computation devices of the cluster system.

The communication method in the cluster system according to the embodiment described with reference to FIG. 3 may be implemented in the form of a storage medium including computer-executable instructions, such as a program module that is executed by a computer. The computer-readable medium may be a certain available medium that can be accessed by a computer, and includes all volatile and nonvolatile media, removable and non-removable media. Furthermore, the computer-readable medium may include all a computer storage medium and a communication medium. The computer storage medium includes all volatile and nonvolatile, and removable and non-removable media that are implemented by a certain method or technology for storing information, such as computer-readable instructions, data structures, program modules or other types of data. The communication medium typically includes computer-readable instructions, data structures, program modules, data of a modulated data signal, such as a carrier, or data of other transmission mechanisms, and includes all types of information transfer media.

Furthermore, the communication method in the cluster system according to an embodiment of the present invention may be implemented as a computer program (or a computer program product) including computer-executable instructions. The computer program includes programmable machine instructions that are processed by a processor, and may be implemented in a high-level programming language, an object-oriented programming language, an assembly language, a machine language, or the like. Furthermore, the computer program may be stored in a tangible computer computer-readable storage medium (for example, memory, a hard disk, a magnetic/optical medium, a solid-state drive (SSD), or the like).

Accordingly, the communication method in the cluster system according to at least one embodiment of the present invention may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These components are connected using various buses, and may be mounted on a common motherboard or using another other appropriate method.

In this case, the processor may process commands within a computing apparatus. An example of the commands is commands that are stored in memory or a storage device in order to display graphic information for providing a Graphic User Interface (GUI) on an external input/output device, such as a display connected to a high-speed interface. As another embodiment, a plurality of processors and or a plurality of buses may be used along with a plurality of pieces of memory. Furthermore, the processor may be implemented as a chipset composed of chips including a plurality of independent analog and/or digital processors.

Furthermore, the memory stores information within the computing device. For example, the memory may include a volatile memory unit or a set of the volatile memory units. For another example, the memory may include a non-volatile memory unit or a set of the non-volatile memory units. Furthermore, the memory may be another type of computer-readable medium, such as a magnetic or optical disk.

Furthermore, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described detailed description is merely illustrative of the present invention, and it will be understood that those having ordinary knowledge in the art to which the present invention pertains can easily make modifications and variations without departing from the technical spirit and essential features of the present invention. Therefore, the above-described embodiments are illustrative in all aspects, and are not limitative. For example, each component described as being in a single form may be practiced in a distributed form. In the same manner, components described as being in a distributed form may be practiced in an integrated form.

The scope of the present invention should be defined by the attached claims, rather than the detailed description. Furthermore, all modifications and variations that can be derived from the meanings, scope and equivalents of the claims should be construed as falling within the scope of the present invention.

What is claimed is:

1. A cluster system comprising one or more nodes, wherein:
    each of the one or more nodes comprises:
    at least one physical computation device;
    a virtualization module configured to manage at least one computation device; and
    a communication module configured to manage communication between the one or more nodes,
    wherein the virtualization module generates at least one virtual computation device corresponding to the other physical computation devices included in the other nodes,
    wherein the virtualization module is a computer program product in a computer readable storage device,
    wherein the each of the one or more nodes operates as a host node and communicates with the other nodes, and
    wherein if the physical computation device interacts with the virtual computation device within a first node, the communication module allows the first node to communicate with a second node including the other physical computation device corresponding to the virtual computation device of the first node.

2. The cluster system of claim 1, wherein when the each of the one or more nodes receives a command, the each of the one or more nodes transfers the command to the physical computation device if the command is a command intended for the physical computation device, and ignores the command if the command is a command intended for the virtual computation device.

3. The cluster system of claim 1, wherein the virtual computation device is determined based on availability information that is information about a total available computational capacity of the cluster system.

4. A communication method in a cluster system including one or more nodes, which include at least one physical computation device, the communication method comprising:
    generating, by each of the one or more nodes, a virtual computation device corresponding to the other physical computation devices included in the other nodes; and
    operating, by the each of the one or more nodes, as a host node and communicating with the other nodes,
    wherein operating as the host node comprises, if the physical computation device interacts with the virtual computation device within a first node, the first node communicates with a second node including the other physical computation device corresponding to the virtual computation device of the first node.

5. The communication method of claim 4, wherein generating the virtual computation device comprises:
    providing, by the each of the one or more nodes, computation device information, to a root node; and
    generating the virtual computation device based on the availability information that is information about a total available computational capacity of the cluster system that has been computed by the root node.

6. The communication method of claim 4, wherein generating the virtual computation device comprises:
    providing, by the each of the one or more nodes, computation device information to other node; and
    computing, by the each of the one or more nodes, availability information that is information about a total available computational capacity of the cluster system based on computation device information received from the other node, and generating, by the each of the one or more nodes, the virtual computation device based on the computed availability information.

7. The communication method of claim 4, wherein operating as the host node comprises:
    when the each of the one or more nodes receives a command:
    transferring, by the each of the one or more nodes, the command to the physical computation device if the command is a command intended for the physical computation device; and
    ignoring, by the each of the one or more nodes, the command if the command is a command intended for the virtual computation device.

8. The communication method of claim 4, wherein operating as the host node comprises, when exchange of data between a virtual computation device and physical computation device of a first node that is one of the one or more nodes is requested, exchanging, by the first node, the data with a second node that includes a physical computation device corresponding to the virtual computation device of the first node.

9. The communication method of claim 4, wherein operating as the host node comprises, when a physical computation device of a first node that is one of the one or more nodes triggers an event for a virtual computation device of the first node, transferring, by the first node, the triggering to a second node including a physical computation device corresponding to the virtual computation device of the first node.

10. The communication method of claim 4, wherein operating as the host node comprises, when a physical computation device of a first node that is one of the one or more nodes waits for an event triggered by a virtual computation device of the first node, waiting for, by the first node, a transfer of an event from a second node including a physical computation device corresponding to the virtual computation device of the first node.

11. The communication method of claim 4, wherein operating as the host node comprises, when a virtual computation device of a first node that is one of the one or more nodes attempts to read a value of a memory object updated by a physical computation device of the first node, transferring, by the first node, the updated value of the memory object to a second node including a physical computation device corresponding to the virtual computation device of the first node.

12. A computer-readable storage medium having stored therein computer-readable program instructions that, when executed by a computer, cause the computer to perform the method of claim 4.

13. A computer-executable program that, when executed by a computer, causes the computer to perform a method comprising:
  generating, by each of one or more nodes, which include at least one physical computation device, included in a cluster system, a virtual computation device corresponding to the other physical computation devices included in the other nodes; and
  operating, by the each of the one or more nodes, as a host node and communicating with the other nodes,
  wherein operating as the host node comprises, if the physical computation device interacts with the virtual computation device within a first node, the first node communicates with a second node including the other physical computation device corresponding to the virtual computation device of the first node.

* * * * *